United States Patent
Sadovnychiy et al.

(10) Patent No.: US 12,292,356 B2
(45) Date of Patent: May 6, 2025

(54) NON-INTRUSIVE INTEGRAL SYSTEM FOR PIPELINES MONITORING IN REAL TIME

(71) Applicant: INSTITUTO MEXICANO DEL PETRÓLEO, Mexico City (MX)

(72) Inventors: Sergiy Sadovnychiy, Mexico City (MX); Juan Manuel López Carreto, Mexico City (MX); Edgar Alberto Canul García, Mexico City (MX); Marco Antonio Hernández Rojo, Mexico City (MX); Fernando Real Gómez, Mexico City (MX); Samuel Eduardo Moya Ochoa, Mexico City (MX); Volodymyr Ponomaryov, Mexico City (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 591 days.

(21) Appl. No.: 17/678,715

(22) Filed: Feb. 23, 2022

(65) Prior Publication Data
US 2022/0276116 A1  Sep. 1, 2022

(30) Foreign Application Priority Data
Feb. 26, 2021 (MX) .................... MX/a/2021/002358

(51) Int. Cl.
*G01M 3/24* (2006.01)
*G06Q 50/06* (2024.01)
*G08C 17/02* (2006.01)

(52) U.S. Cl.
CPC ............ *G01M 3/243* (2013.01); *G06Q 50/06* (2013.01); *G08C 17/02* (2013.01)

(58) Field of Classification Search
CPC .......... G01M 3/243; F17D 3/01; G06Q 50/06; G08C 17/02
See application file for complete search history.

(56) References Cited

U.S. PATENT DOCUMENTS

| 5,343,737 A * | 9/1994 | Baumoel ................. G01F 1/668 |
| | | 73/40.5 R |
| 7,920,983 B1 * | 4/2011 | Peleg ..................... G06Q 10/06 |
| | | 702/50 |

(Continued)

*Primary Examiner* — Paul M. West
(74) *Attorney, Agent, or Firm* — FisherBroyles, LLP; Jason P. Mueller

(57) ABSTRACT

The present disclosure integrates several methodologies for the detection and location of leaks in pipelines that transport hydrocarbons in liquid or gaseous phase. Detection is achieved through the management and processing of the data obtained by various measuring devices installed at strategic points on the pipeline infrastructure, this system does not alter neither structure nor mechanics of pipe and in case of a leak or flow caused by unauthorized actions, sensor system collect information on the physical variables of the fluid. This system may be made up of acoustic monitoring techniques, detection of negative pressure waves, as well as methods of mass and energy balance, integrated by multiple sensors, which are managed and controlled by electronic systems that process the information to determine the point of occurrence of a leak in digital maps. The system operates autonomously through the integration of solar cells for power supply and has satellite communication systems between the inspection sites and a monitoring center. It also can be remotely linked with SCADA systems (Supervisory Control and Data Acquisition) in real time. Additionally, it also has the technological integration of a motion sensor and a video and/or infrared camera together with a satellite modem whereby it sends images and video to the monitoring center, at the time of an unauthorized intrusion occurred on the pipeline in the area protected by a remote pipeline monitoring terminal (RPMT).

19 Claims, 13 Drawing Sheets

(56) References Cited

U.S. PATENT DOCUMENTS

| | | | | |
|---|---|---|---|---|
| 11,274,797 B1* | 3/2022 | Zhu | ................ | G01M 3/2815 |
| 2009/0322544 A1* | 12/2009 | McDowell | ............ | F17D 5/06 |
| | | | | 73/40.5 R |
| 2013/0066568 A1* | 3/2013 | Alonso | ................ | F17D 5/06 |
| | | | | 702/51 |
| 2015/0339902 A1* | 11/2015 | Domínguez Latorre | ............... | |
| | | | | G08B 13/2462 |
| | | | | 340/572.1 |
| 2016/0252422 A1* | 9/2016 | Howitt | ................ | E03B 7/071 |
| | | | | 73/40.5 A |

* cited by examiner

NON-INTRUSIVE INTEGRAL SYSTEM FOR PIPELINES MONITORING IN REAL TIME

CROSS REFERENCE

The present disclosure claims the benefit of the filing date of Mexican Application No. MX/a/2021/002358 filed with the Mexican Patent Office on Feb. 26, 2021, the entire contents of which is incorporated herein by reference.

TECHNICAL FIELD

The present disclosure is related to a novel instrumented system used for monitoring pipelines remotely and non-intrusively. The field of application of this technology is specifically the detection and location of leaks and clandestine intakes in real time, as well as the detection of anomalous events that effect and impair the proper functioning of long land pipelines that transport hydrocarbons in their liquid and gassy states.

BACKGROUND

Pipelines are commonly used to transport fluids over long distances that can range from tens to hundreds of kilometers. This includes pipelines used to transport crude oil, liquid and gas phase fuels from one location to another, such as from an oil well to a refinery for processing or from processing centers to distribution centers. All pipes can be susceptible to leaks due to a series of factors, including wear, accidents and natural phenomena and, very recently, destruction by third parties that cause serious accidents and economic losses due to attempts or actions to steal products, especially from fuels. Fluid loss due to pipeline leaks results in hundreds of millions of dollars in lost revenue. In addition, product leakage can negatively affect the environment and in cases of accidents it can affect populations and human lives. Therefore, it is important to have leak detection systems, especially in pipeline systems that transport strategic or economically important fluids. However, the large volume of data and/or the need to monitoring multiple pipelines simultaneously can be a complicated activity for the personnel in charge to evaluate the information in a timely manner. Loss of revenue and/or environmental damage may occur before leaks are detected. It can also be difficult to present the information to staff in a format that allows quick assessment and action. Consequently, there remains a need for improved methods and systems to quickly identify the existence of a leak so that response actions can be developed in a timely manner. The speed of these actions can help to greatly reduce the consequences of accidents or incidents.

There are various technologies used for the inspection and monitoring of pipelines, regulated by national and international standards and practices (API 1130, API 570, API 1175, CSA2662). Pipeline leak detection is of increasing importance due to environmental protection regulations and ecological concerns involved. Currently, the detection of leaks in pipelines that transport hydrocarbons has become much more important as they are related to illegal drilling of the pipeline to remove product, an action carried out by people dedicated to criminal activities. Such events have increased considerably and without adequate prevention, putting the people who carry out the act at risk of an accident, damaging the facilities, the environment and generating considerable economic losses for the companies.

Several companies have developed methods and technologies for the detection of leaks in pipelines with inefficient results and limitations, therefore, the problem continues to require improved systems that detect this phenomenon with better technological qualities that contribute to reducing or controlling the associated problems. In general terms, leak detection methods or systems can be classified into two groups: those that work from inside the duct, such as intelligent pigs whose disadvantage is the response time to locating a leak, due to that require a long period of time to analyze the information obtained from the inspection carried out on the pipeline, in addition to the fact that its operation is limited to the existence of facilities for its launch and recovery. The internal systems must follow the recommended practices found in API 1130. The other group of inspection systems is made up of equipment which work from outside the pipeline, this group is made up of two blocks: the first one is made up of hardware constituted by electronic systems, the second one is made up of specialized software.

Pressure, temperature, flow, vibration and fiber optic sensors or any other sensor installed on the outside of the pipe that responds directly to the presence of a leak can be considered within the hardware block. Unlike internal systems, there are no accepted API engineering standards for engineers designing external systems, making careful implementation and installation critical. Software-based methods typically consist of computer codes that use information from various types of sensors distributed at various positions along a pipeline and are intended to issue alerts by detecting fluctuations recorded by the sensors. An example of these are SCADA systems comprised of a data management system fed by flow, pressure and temperature sensors as well as mass balance programs. A disadvantage of these software-based methods is that they also often rely on data from discrete sensors to monitor pipeline parameters such as flow, temperature, and pressure. In such systems, assumptions of uniformity of conditions along a pipeline, particularly of temperature, are typically needed, and any deviation from such uniformity by topographical conditions can lead to errors. The present disclosure is directed to a a system that integrates different methods to detect leaks in pipelines effectively and in real time, given that the existing methods do not provide sufficient information to establish the moment in which an intrusion has occurred to the pipeline or generated a leak, with a reliability of 95%, because some of them work with individual sensor systems or with the application of several techniques that turn out to be insufficient. In the specialized literature consulted, the following descriptions referring to pipeline monitoring systems in real time are mentioned as examples.

The US patent US 20140142870 B1, called "Method and apparatus of estimating wave velocity of negative pressure wave in a fluid transportation" uses pressure sensors to detect the negative pressure wave generated by the effect of fluid exit through an orifice, which considered as a product leak. The system calculates the travel or propagation time of the wave in both directions to locate the leak point Another similar disclosure is found in the U.S. Pat. No. 9,886,103 B2 called "Oilfield Conduit Leakage Detection System", which uses optical fiber along the pipe to measure acoustic effects and temperature, the system calculates the volume of fluid in the duct and compares it with data calculated by a processor, the results obtained are compared with mass flow measurement data in order to detect leak thresholds in ducts, the patent includes a computer program whose code is responsible for processing the information. Similarly, the US patent application US 20060225507 A1 called "Pipeline Monitoring System" mentions that it uses optical fiber on the pipe, which operates as a temperature sensor and an acoustic sensor, to monitor a pipe for leaks by performing acoustic monitoring. of the pipe and, also sensing temperature changes on or near the outside of the pipe. The temperature information is requested as a validity check of the acoustic monitoring results that may indicate that a leak has occurred; this system is particularly suitable for above ground pipeline monitoring, although it can also be used with underground pipelines.

Companies like Sensonet in the U.K. and Ambher Engineering in Mexico, offer acoustic systems for leak detection using optic fiber. In these systems, the optical fiber is installed attached to the duct or parallel to it, separated at a certain distance and adequate depth; it provides good results in short sections and can be easily installed in piping systems that are under construction. In buried, old, and long pipes, the cost of installation is very high and in areas with a high incidence of damage to the pipe by third parties' intervention, it is unaffordable since in each event it is necessary to repair it due to the destruction caused by people outside the company. In Mexico, a pipeline can register up to 1,400 interventions by third parties per year, which would indicate that the optical fiber would have to be repaired 1,400 times, a situation that is inadequate and highly expensive. It should be noted that the applicant is aware that other types of systems have been developed for monitoring pipelines that combine various methodologies or with independent applications, for the detection of leaks, such as the recording of negative pressure waves, direct measurement of pressure, mass balance systems, flow measurements, external acoustic sensors, fiber optic mounted sensors, as well as temperature sensors. In this regard, a summary of the references that were consulted where this combination of methodologies of these equipment or systems was found is provided.

In U.S. Pat. No. 10,473,270 B2 "Pipeline Leak Detection System" dated Nov. 19, 2019, the system provides leak detection user interfaces. Information in the user interface may include results of analysis of the collected data, as well as notifications of that collected data indicates an anomaly in the pipeline.

The U.S. Pat. No. 10,481,036 B2 "Pipeline Leak Detection System" dated Nov. 19, 2019 is related to the in-service detection of a leak in a flow line, whether the medium is a fluid, liquid or gas, a mixture of fluids (gas and liquids). More particularly, the system relates to a serial and interconnected device or devices that monitor flow and immediately detect the occurrence of a leak, pinpointing its location and calculating the amount of the leak.

The U.S. Pat. No. 9,846,103 "Oilfield Conduit Leakage Detection System" published on Dec. 19, 2017 describes a system and method to identify and measure the amount of leakage from a conduit used in the transport of a fluid, such as a hydrocarbon fluid, for example, oil, or a gas, like natural gas.

The publication of US patent application US 20140142870 A1 "Method and apparatus of estimating wave velocity of negative pressure wave in a fluid transportation" dated May 22, 2014, refers to a method and apparatus for estimating the velocity of a pressure wave negative in a fluid transport pipeline. The method includes receiving a plurality of pressure signals from a plurality of sensors to estimate the wave velocities of the negative pressure wave in a waveless source sensor segment and the wave source sensor segment.

The publication of the US patent application US20100312502 A1 "System for detection leaks in single phase and multiphase fluid transport pipelines" of Dec. 9, 2010 describes a system developed for the detection of leaks in single-phase and multiphase fluid transport pipelines characterized by use measurement cells, sensors, local processors, and neural models, where measurement sensors and measurement cells are installed at various locations along the pipeline for the purpose of monitoring characteristic leakage and normal operating transient waveforms of the pipe. The local processors are responsible for obtaining and sampling the signals provided by the sensors.

The publication of the US patent application US20060225507 A1 "Pipeline Monitoring System" of Oct. 12, 2006, discloses a process and apparatus for detecting possible leaks in a pipeline. The pipeline is continuously monitored by acoustic monitoring means, and acoustic events indicating a possible leak are noted.

The publication of the US patent application US20020124633 A1 "Method and apparatus for pattern match filtering for real time acoustic pipeline leak detection and location" of Sep. 12, 2002, is related to a method and an apparatus for detecting and locating leaks in a pipeline. Pattern matching filtering is used to reduce the false alarm rate, increase sensitivity, and improve leak location accuracy, while quickly detecting leaks using the acoustic signal generated by a leak event in pipelines containing gas or liquid under pressure.

The U.S. Pat. No. 47,967,466A, "System for monitoring pipelines", published on Jan. 10, 1989, refers to a system for monitoring pipelines, which determines the probability of a leak as opposed to reality using a statistical average, using data from pressure and flow.

The US patent U.S. Pat. No. 4,289,019 "Method and means of passive detection of leaks in buried pipes" of publication date Sep. 15, 1981 describes a method and means for the passive detection of a leak in a buried pipe containing pressurized fluid includes a plurality of acoustic detectors that are placed in contact with the pipe. The detectors detect the noise produced by the leak and the detected signals are correlated to locate the leak.

The US patent U.S. Pat. No. 3,667,285 "Leak detection system" dated Jun. 6, 1972, the publication refers to a system for detecting relatively small leaks in partially inaccessible pipes that have high performance. To detect leaks, information from a flow meter and pressure and temperature transducers placed at each end of the pipe is connected via telephone lines to a central computing facility.

SUMMARY

The present disclosure integrates multiple leak detection techniques in a single system, which significantly exceeds each of the aforementioned references, being a distinctive feature the non-intrusive operation of the pipeline and the integration of technological developments that process the physical variables characteristic of the fluid, likewise, electronic communication and data processing systems are integrated with which the detection and location of leaks is achieved.

Therefore, one of the objects of the present disclosure is to provide an integral, non-intrusive system for detecting leaks and unauthorized installed intakes (clandestine intakes) which generate problems in the optimal operation of pipelines that transport hydrocarbons.

Another object of the present disclosure is to integrate various technologies that use multiple sensors to measure physical flow parameters, data acquisition and processing systems, electronic control systems, communication systems, as well as algorithms developed in specialized programming language, technologically integrated to locate the point where a product leak occurs in real time, which can be viewed on a digital map through a communication interface installed in a pipeline monitoring center.

One more object of the present disclosure is to provide a pipeline monitoring system, which is complemented by a perimeter surveillance equipment, integrated by motion sensors and a camera, with the option of night vision, with which an alarm can be activated, providing the ability to view the site remotely.

Yet another object is to provide a pipeline monitoring system that reduces the rate of occurrence of false alarms, through the integration of various methodologies, with which it is possible to establish the moment in which an intrusion into the pipeline has occurred or a leak has been generated.

For a more complete understanding of the nature and objects of the present disclosure, which includes the apparatus that owns the construction, the combination of elements and sensors, electronic devices, data acquisition systems, communication systems and developed algorithms, as well as the arrangement of parts, will be fully described in the following "Detailed Description" section, and the scope of which will be recited in the appended claims.

BRIEF DETAILED DESCRIPTION OF THE DRAWINGS

The drawings that accompany the present disclosure are described to have a better understanding of the objects, without thereby limiting its scope.

Figure 4:
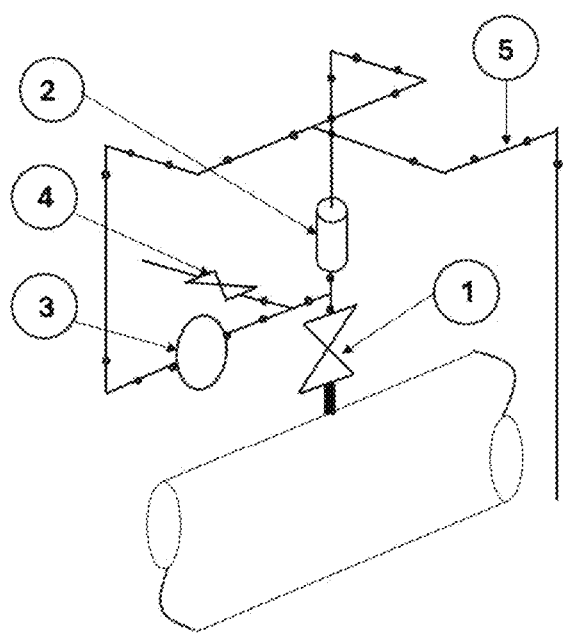

FIG. 4 refers to a diagram that illustrates the installation of sensors on the existing connections in the pipeline to be inspected.

Figure 5:
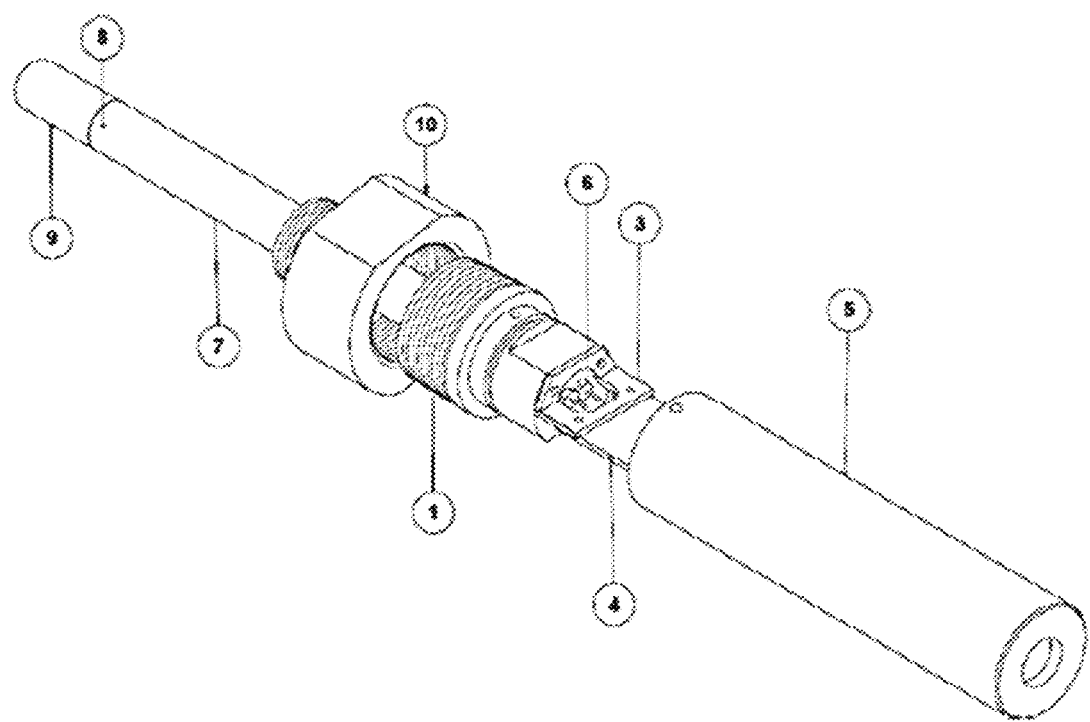

FIG. 5 corresponds to the mechanical arrangement specially designed to install the hydrophone in the duct, to allow contact with the flow.

Figure 6:
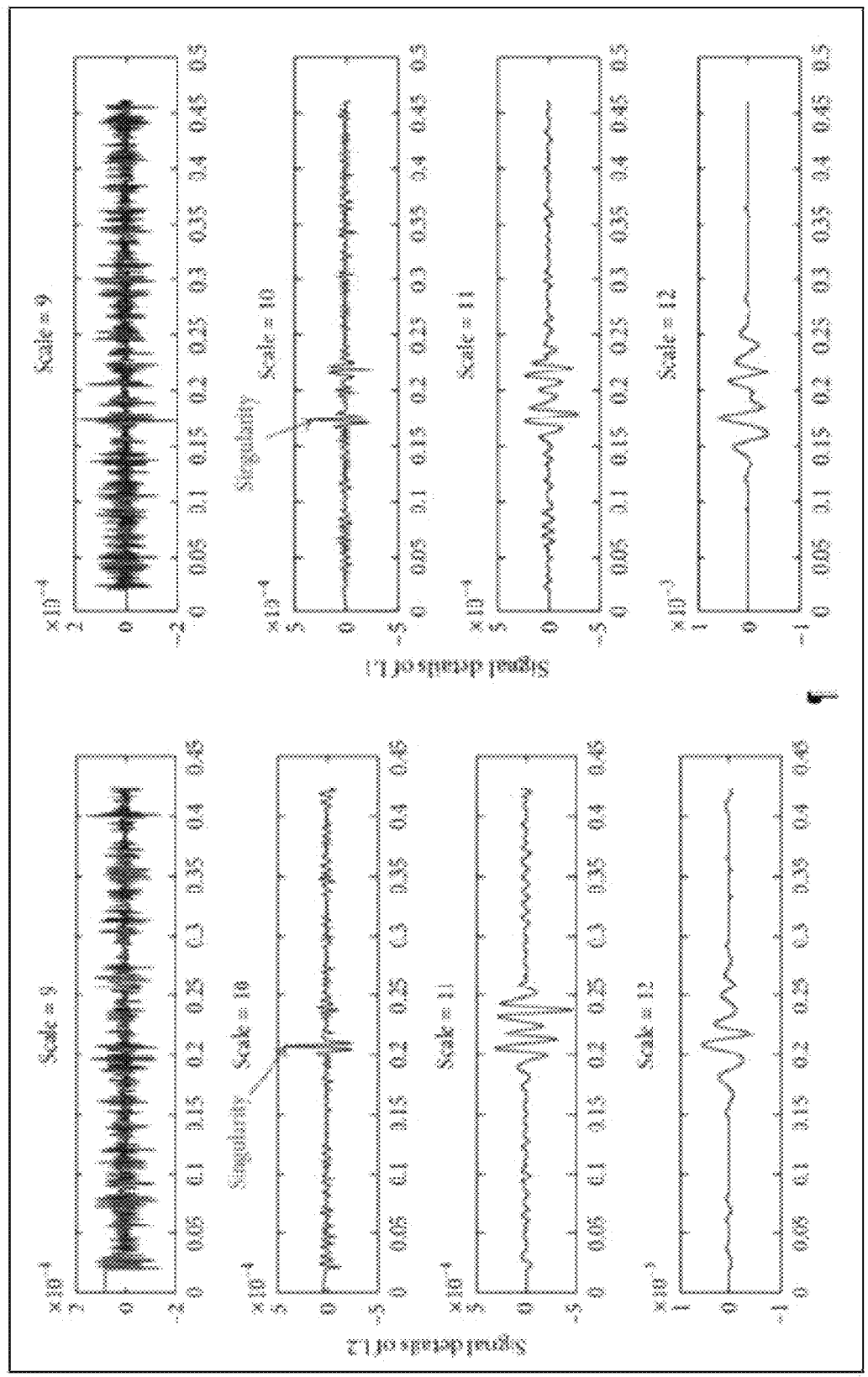

FIG. 6 shows a negative pressure wave signal processed using the wavelet transform, which is a mathematical tool used in process control and in the detection of symptomatic abnormalities, which allows the discrimination of abnormal vibrations from normal vibrations.

Figure 7:
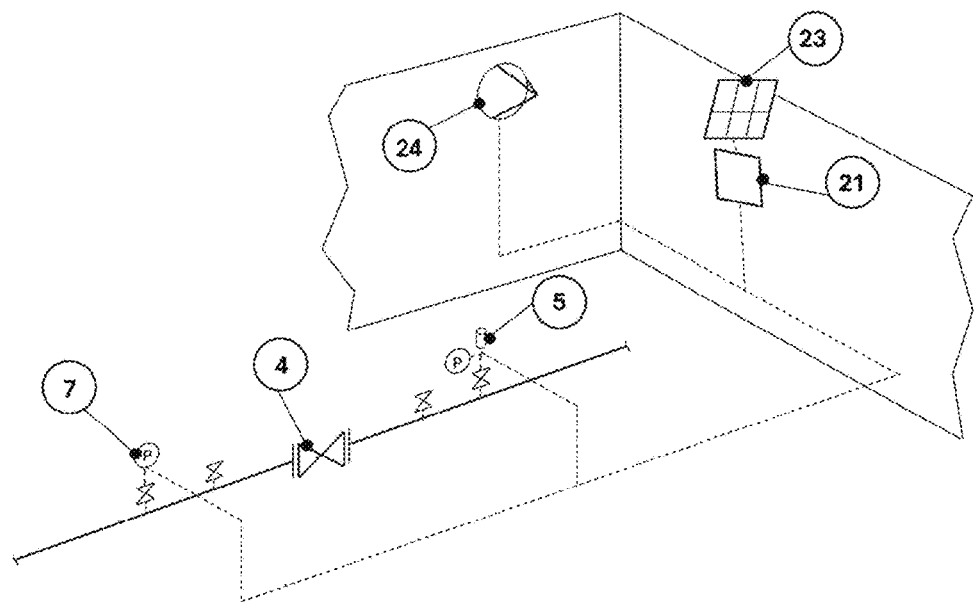

FIG. 7 presents an example of installation of the data acquisition equipment in the field.

Figure 8:
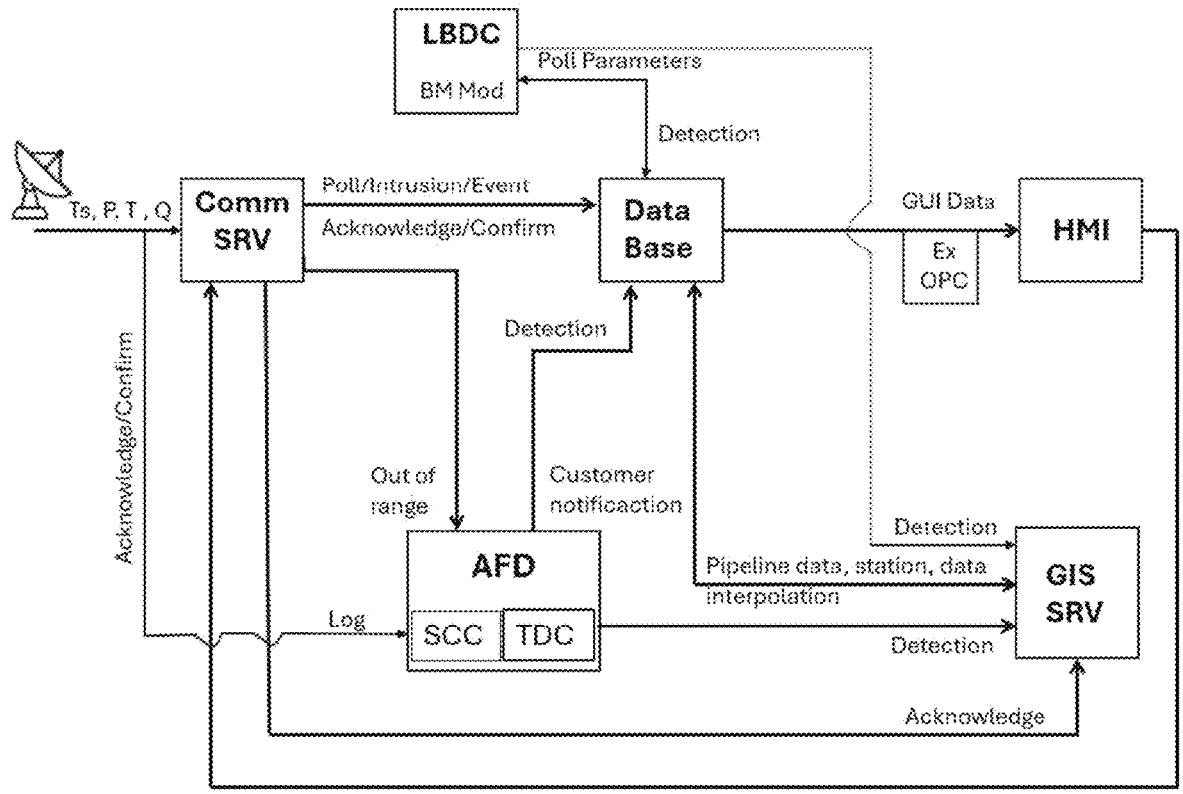

FIG. 8 shows the distribution diagram of the modules that make up the application of the communication interface with the user.

Figure 9:
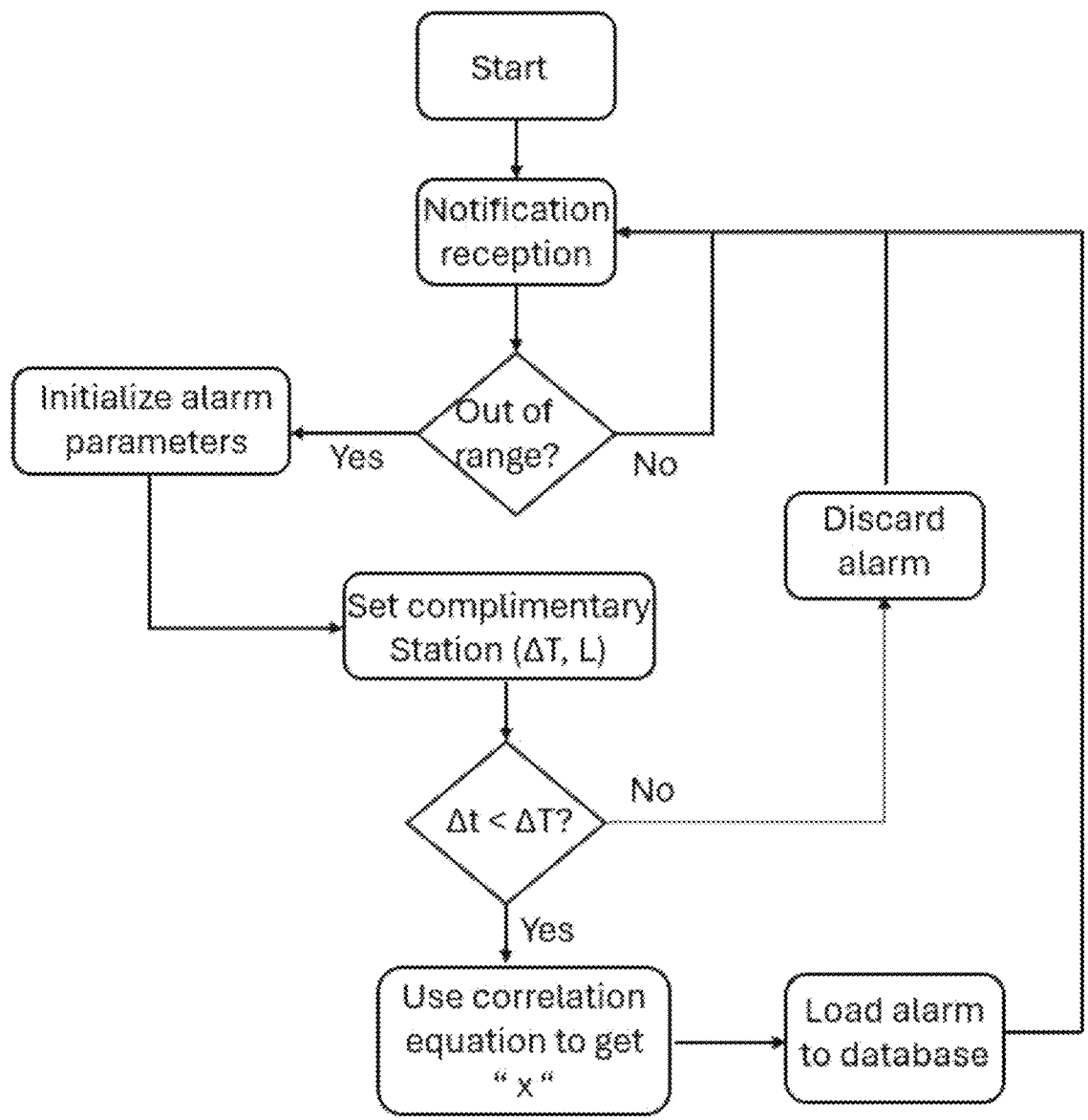

FIG. 9 shows a flowchart of the ALD method leak detection algorithm.

Figure 10:
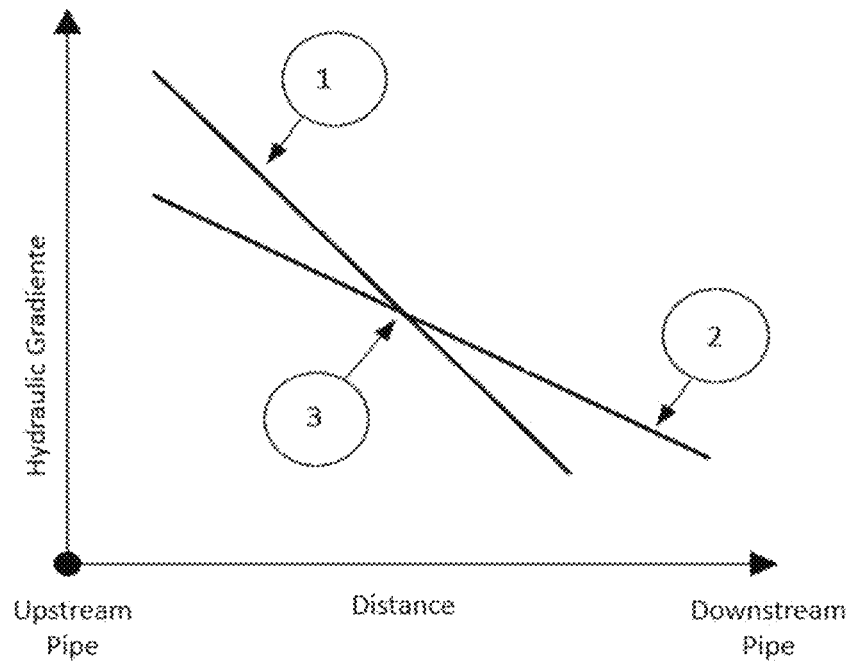

FIG. 10 illustrates the interaction of the procedure used to determine the existence of a leak, with the fluid energy and mass balance method.

Figure 11:
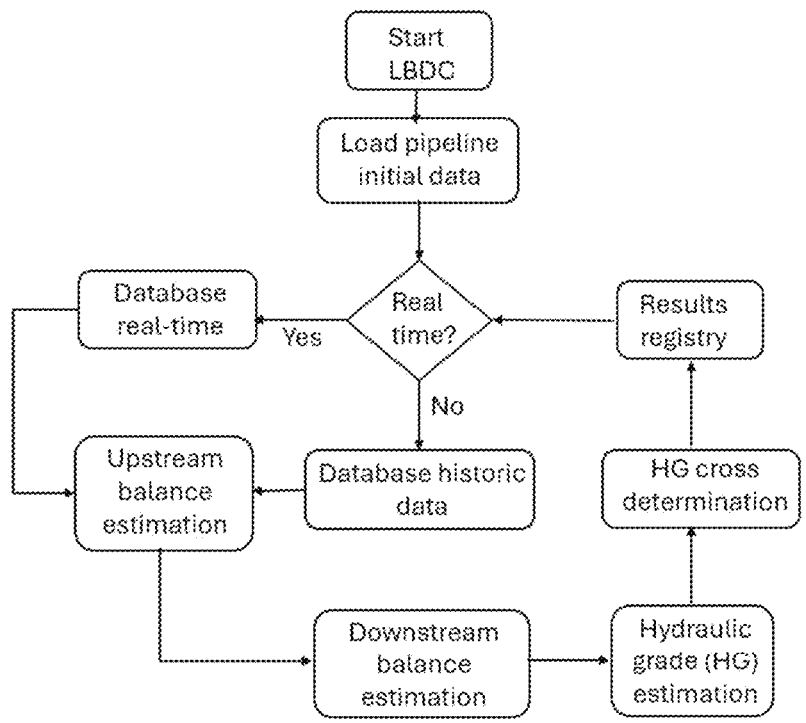

FIG. 11 provides the diagram of the working principle of the mass and energy balance method.

Figure 12:
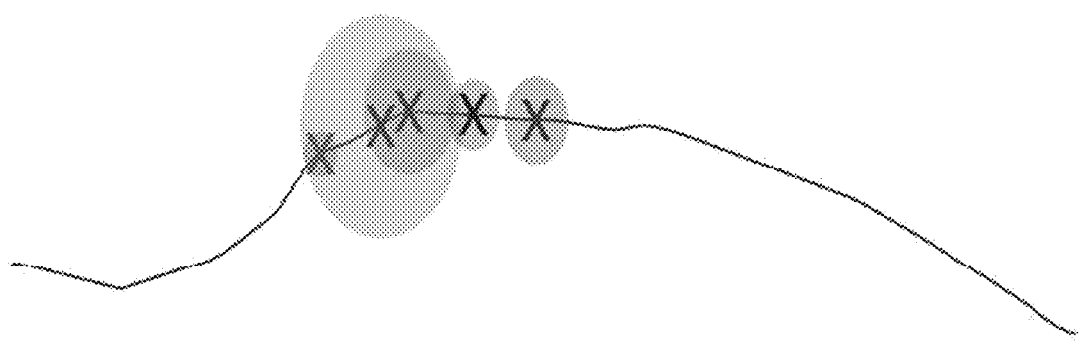

FIG. 12 illustrates a representation of the uncertainty of detection and location of an event recorded by the different detection modules.

Figure 13:
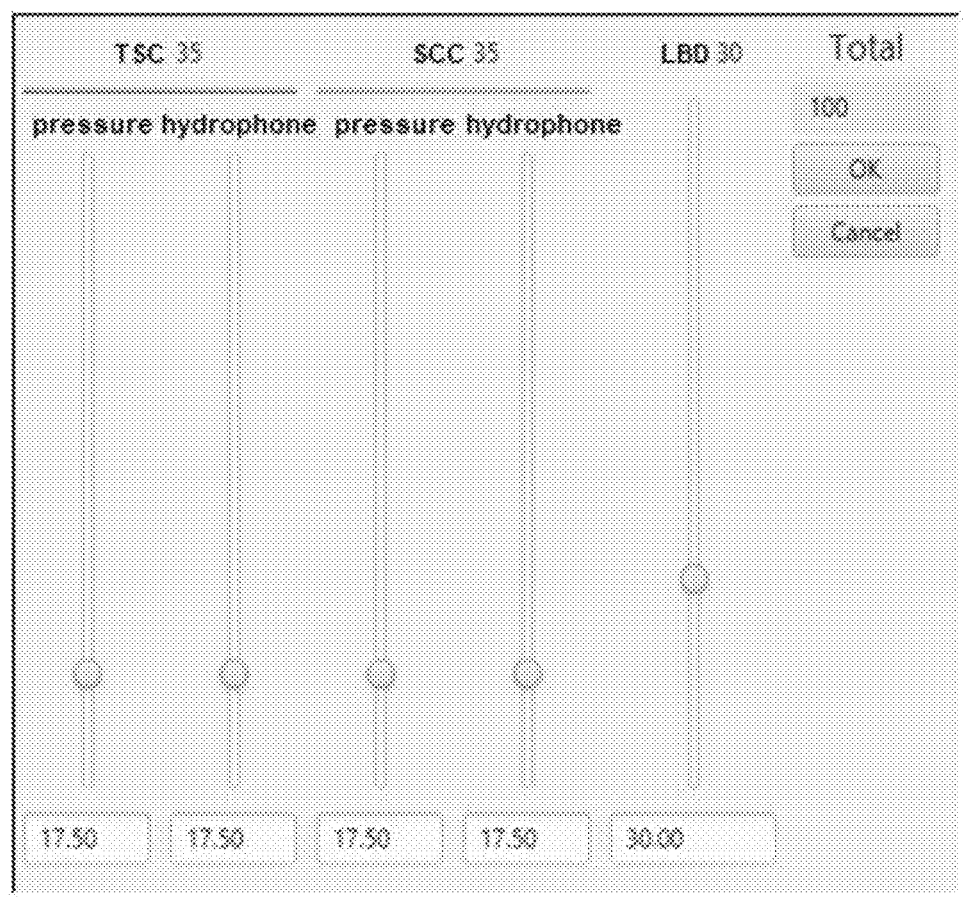

FIG. 13 shows a screen with an example scenario with 5 detection methods.

Figure 14:
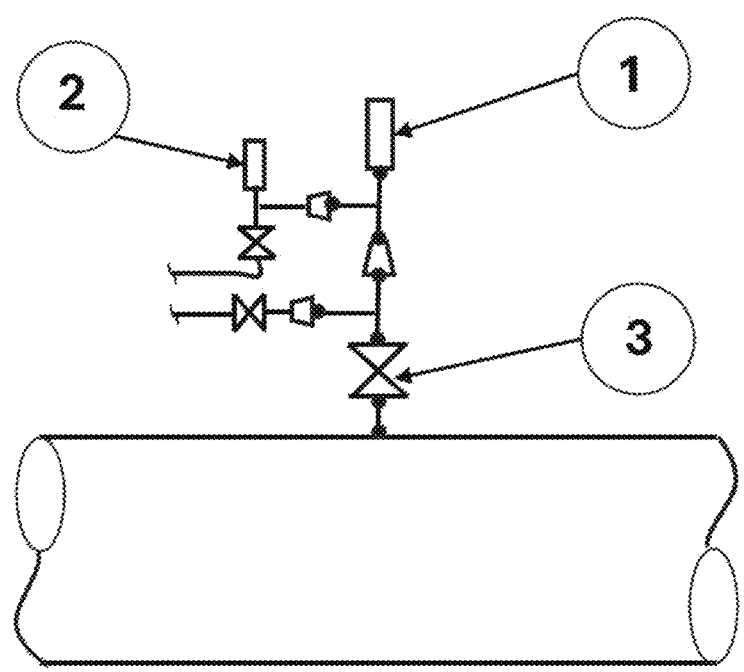

FIG. 14 provides an illustration of the installation of sensors on existing connections in the pipeline.

Figure 15:
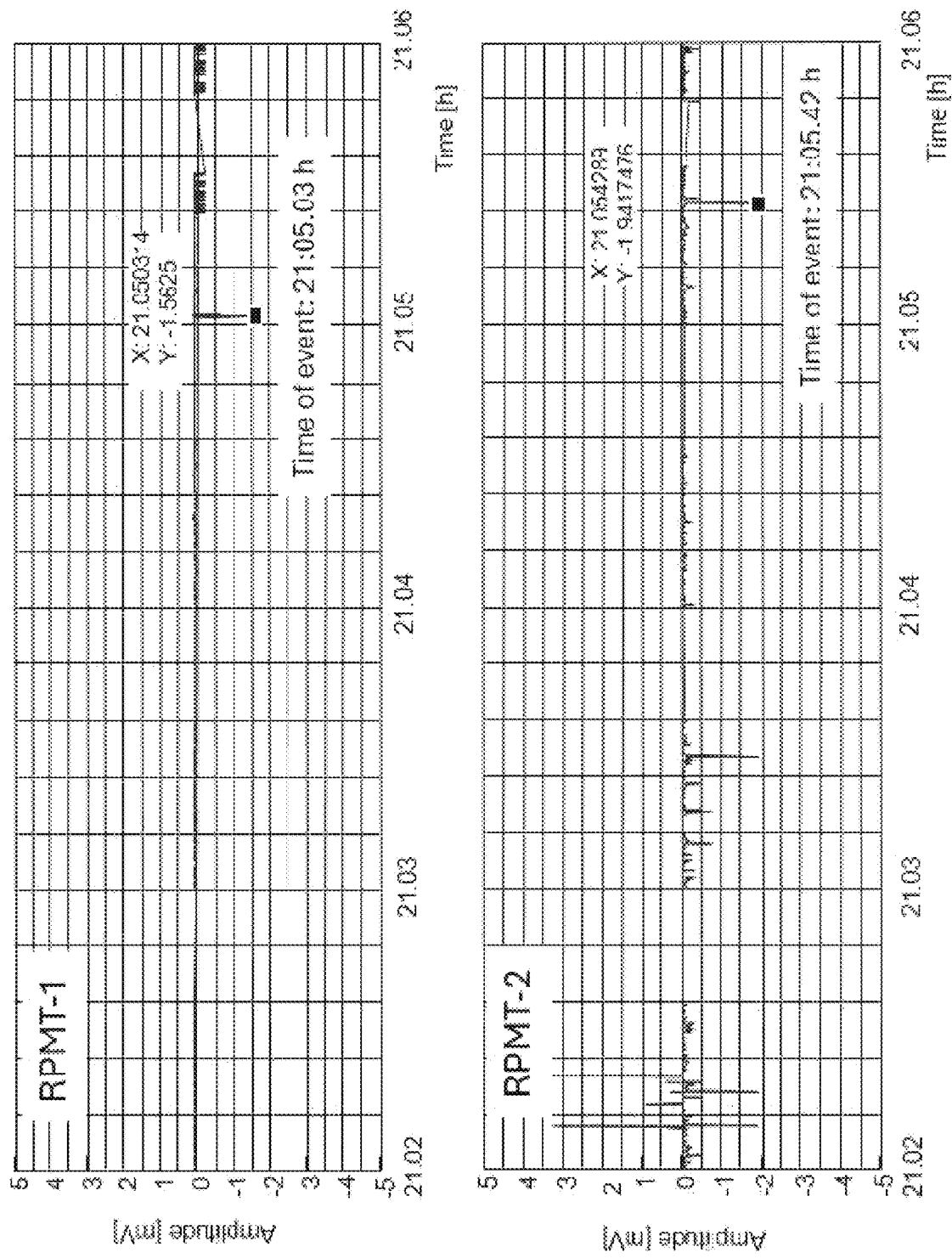

FIG. 15 corresponds to an example of the registration and location of events of the pipeline monitoring system.

Figure 16:
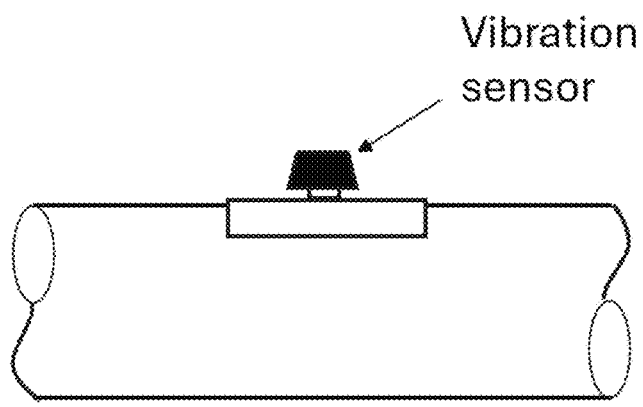

FIG. 16 presents an example of the vibration sensor installation on the duct.

Figure 17:
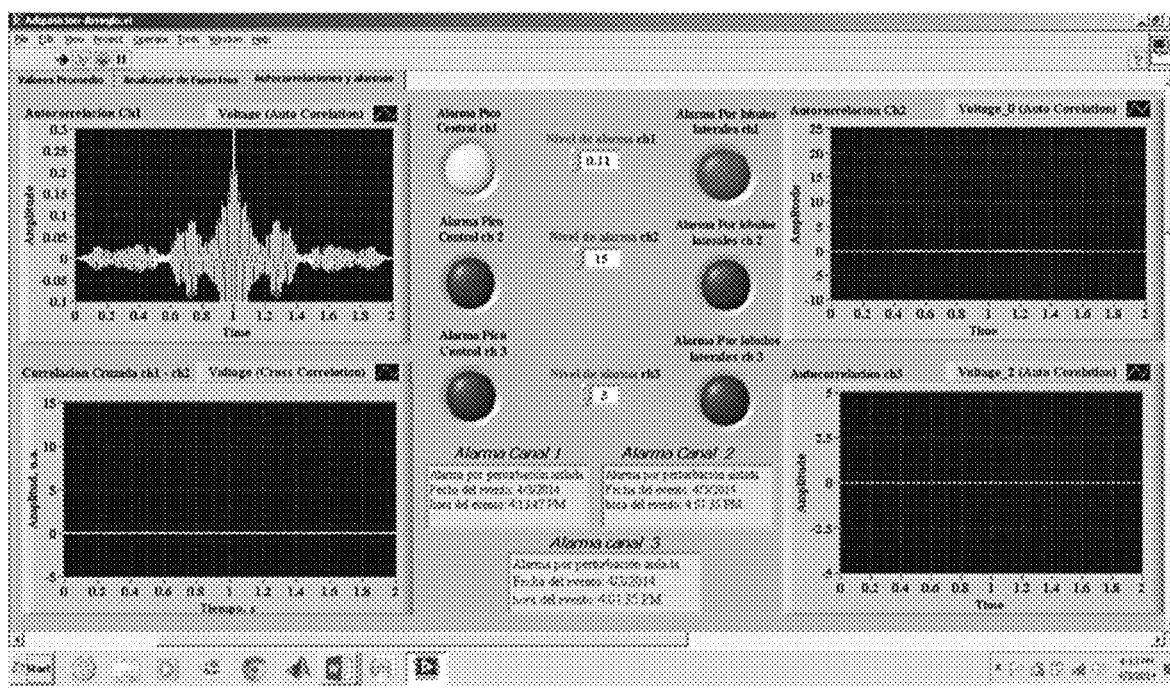

FIG. 17 shows a screen of the activation of an alarm in the process controller.

Figure 18:
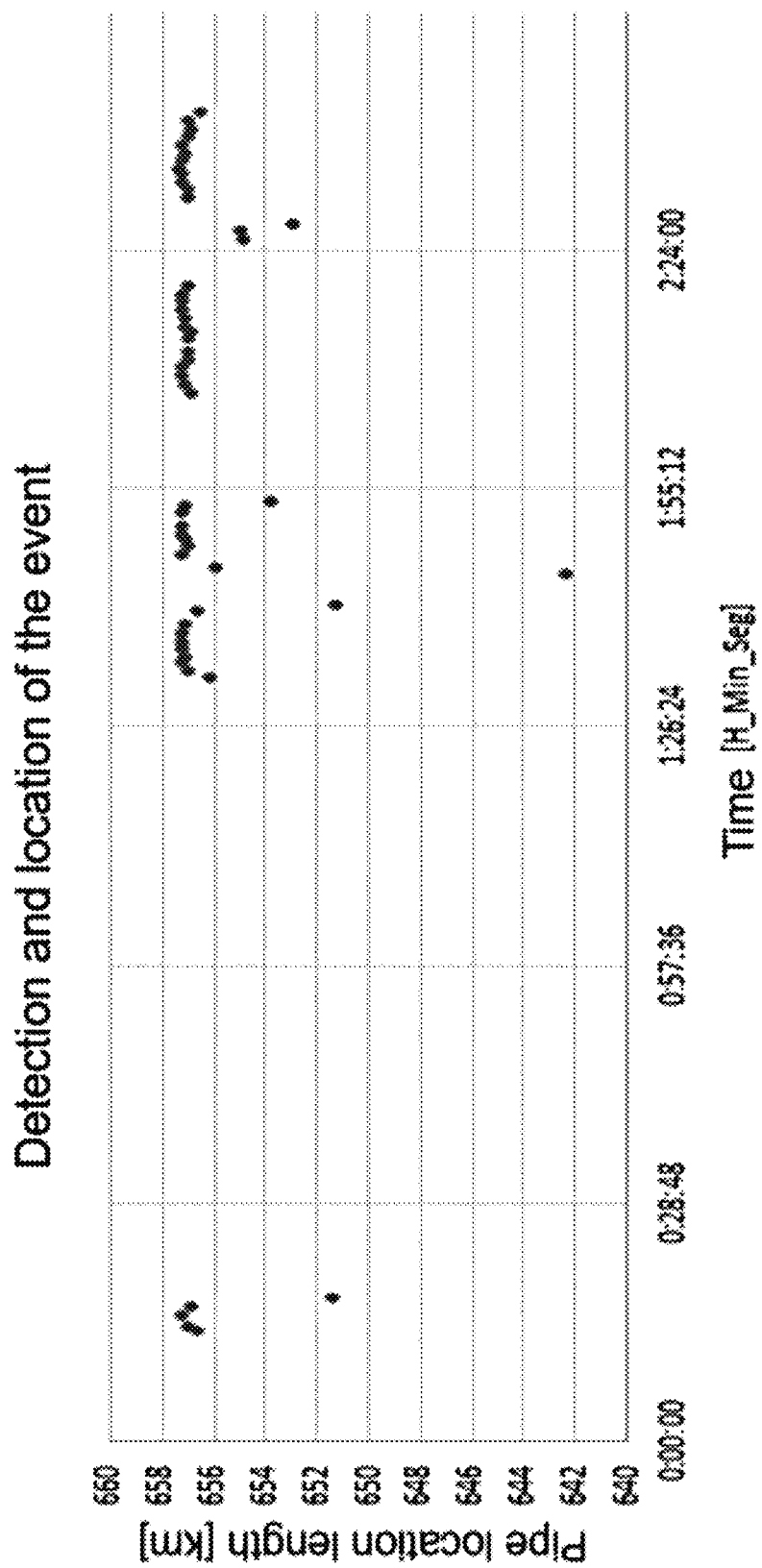

FIG. 18 shows 5 hydrocarbon outflow events recorded by the monitoring system.

DETAILED DESCRIPTION

The present disclosure is related to a comprehensive, non-intrusive system for detecting leaks and unauthorized installed intakes (clandestine intakes) which generate problems in the optimal operation of pipelines that transport hydrocarbons. The system and related methods use signals from multiple sensors to analyze the physical conditions of the fluid in real time due to the effects of a leak in a pipeline. The comprehensive pipeline monitoring system detects hydrocarbon leaks and identifies the point where the damage occurs through the configuration of three integrated modules of an Acoustic System made up of hydrophones and temperature sensors, a Negative Pressure Wave Detection System constituted by pressure and temperature sensors and a System that analyzes the Mass Balance and fluid energy by means of flow measurement, as well as pressure and temperature sensors. For their operation, these systems must be installed at two points along the pipeline or in sections where an inspection or monitoring of the pipeline operation is required.

The installation of several systems can form a monitoring network along the pipeline. Each system has the appropriate sensors to acquire information on the behavior of the flow, which is sent to a data acquisition controller that processes the data and sends it to a server located in a monitoring center installed on a site far from the facilities. For this, satellite communication systems are used and it has a redundant communication system that uses the cellular communication network. The system uses decoded data strings, which contain the identification of the section under study and data of the analyzed variables, these data are sent through a polling system every minute, using a Modbus communication protocol to the central database made in MySQL from where the data is taken by the different algorithms. The generation of alarms of leaks or intrusion into the pipeline and the location of the point of incidence is carried out by means of data crossing and correlation techniques, this process begins once an abnormal variation in the behavior of the variables has been detected, in principle by data analysis through a Data Acquisition and Processing Controller (DAPC). The monitoring system has a user interface that has been adapted with programming codes to visualize the behavior of the pipeline graphically in real time and visualize the leak point through virtual plans, which are previously loaded with the geographical coordinates of the pipeline to locate the place where the event takes place. The pipeline monitoring system can be connected to a SCADA system to provide the information obtained from the pipeline inspection and to take the appropriate actions to control the leak. An important feature of this system is that the sensors used are installed outside the pipeline, taking advantage of the existing infrastructure, a feature known as non-intrusive, allowing the operation of the pipeline without any alteration of the flow. Another important feature of this pipeline monitoring system is that it can work on pipelines that transport liquid and gas phase fluids. One more characteristic of the pipeline monitoring system, of the present disclosure, is that it has a perimeter surveillance system, integrated by motion sensors that activate a camera with which it is possible to view the place remotely, this system can be Installed in strategic locations for surveillance, the system can operate with night vision and works 24/7. The instruments installed in the field do not require to take power from the local supply network, since they have an autonomous electrical power supply unit made up of a set of batteries, converters, charge regulators and a solar cell. All the equipment that is installed in the field had been designed taking as a reference the regulations required for its operation in high-risk areas, and it has the necessary security features and adaptations to withstand the destruction caused by third parties interaction.

Figure 1:
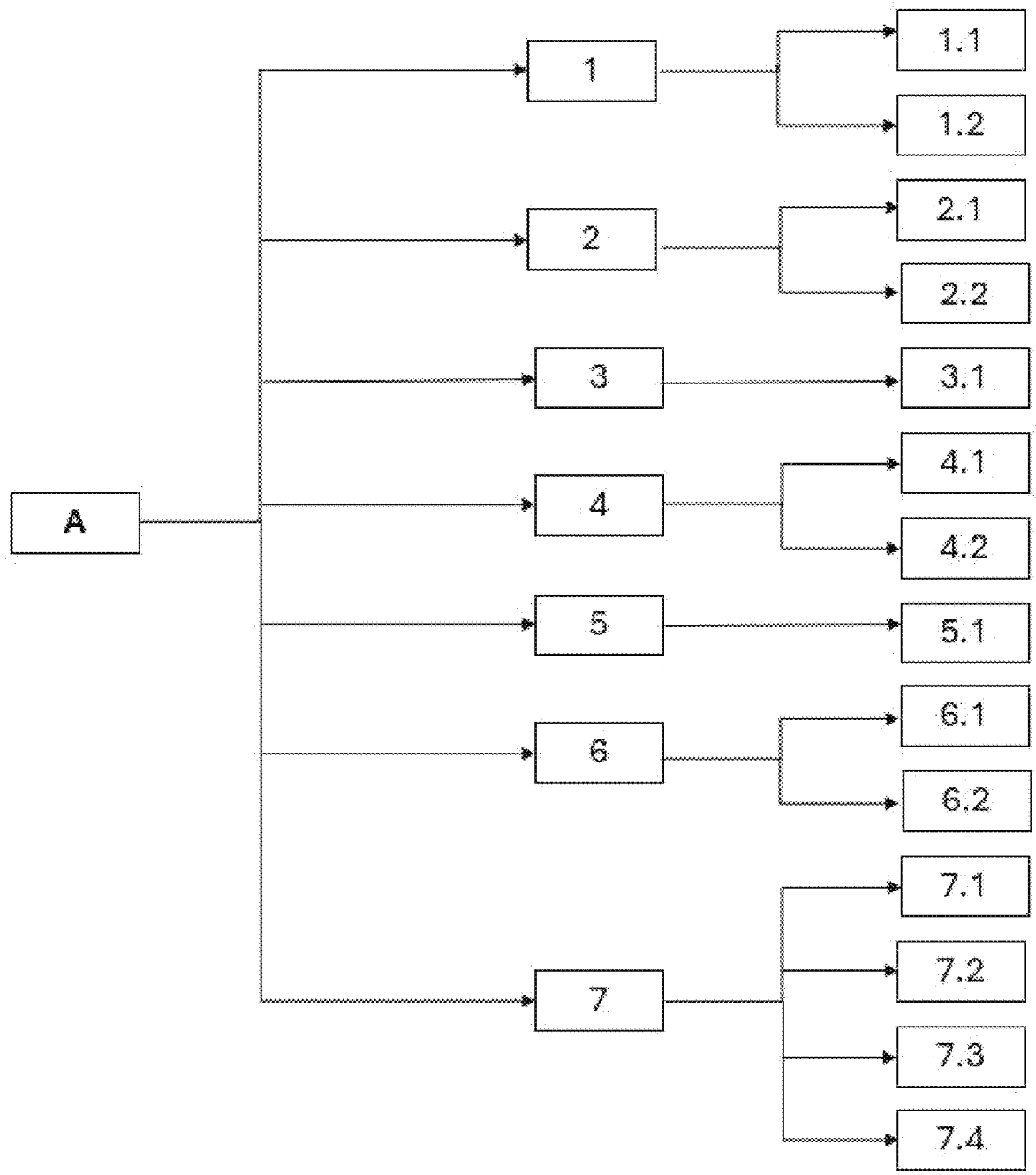
FIG. 1 shows a bock diagram of the systems that make up the Comprehensive Non-Intrusive System for Monitoring Pipelines in Real Time.

For a better understanding of the elements that make up the monitoring system and purpose of the present disclosure, FIG. 1 shows the parts that constitute an embodiment of the disclosure in a block form. As it can be seen, the main block corresponds to the comprehensive non-intrusive pipeline monitoring system A, from there they emerge: the first block that corresponds to the Direct Contact Sensor Block 1, made up of pressure sensors 1.1 and hydrophones 1.2, which can operate at pipeline pressure, have a fast response time, and can withstand outdoor working conditions. The second block corresponds to a Surface Sensor Module 2, made up of temperature sensors 2.1, ultrasonic flow meters 2.2, the temperature sensors are of the resistive type, and they work at the temperature of the duct and endure environmental conditions. The third block corresponds to the Data Acquisition System 3, where a Data Acquisition and Processing Controller (DAPC) 3.1 with PLC functions which provides data in real time and reliable control; this device is the basis of the Acquisition and Signal Conditioning System, the DAPC operates with coded instructions and has features that can be controlled and monitored remotely by, using a web server or a Supervisory Control and Data Acquisition (SCADA) network. The fourth block is made up of Communication System 4, which works with satellite communication systems 4.1 and cellular communication systems 4.2. The communication system is designed to transmit data, images and/or video in real time to a monitoring center by satellite communication as the primary channel with a guaranteed transmission time availability of 99% and as an alternative or secondary channel a cellular communication using an industrial modem that allows Ethernet to be communicated wirelessly and in a securely form. Serial connectivity to remote devices is carried out through 4G LTE mobile telephony services with the possibility of working up to a 3G network. The modem is recommended for programming and maintenance of remote equipment, remote data collection, SCADA systems and machine-to-machine applications, this route is currently limited to data transmission, a situation that depends on network coverage cell. This communication option will only be used in case the satellite system does not report data transmission from the remote units. The cellular transmission system has been designed as a support or as a redundant system to avoid the loss of data transmission via satellite. The fifth block is made up of the Energy Supply System 5, made up of an autonomous energization system through the use of solar cells and batteries 5.1, which together supply energy 24/7.

The sixth block is made up of a Perimeter Surveillance Module 6, which does not contribute to leak location methodologies, however it can be used to look out strategic sites in real time, especially in places where there is a sectioning valve; It has motion sensors 7.1 that have a resistance to damage type IK10, corresponding to an international classification of protection levels, provided by enclosures of electrical equipment against impacts. It has a video camera 7.2 with night vision, face recognition and movement tracking systems. The seventh is a Data Processing Module 7, where the algorithms used to process the information recorded by the different sensors are integrated, these are: Direct Time Stamp Correlation Algorithm 7.1 and Cross Correlation Algorithm 7.2, both used with pressure and hydrophone signals, as well as the Fluid Energy and Mass Balance System Algorithm 7.3 and the User Interface Algorithm 7.4; all of them are integrated using correlations to provide information on the existence of a leak at the time of its occurrence and its location.

The present disclosure can be applied in strategic pipelines and as part of pipeline integrity management and maintenance programs, either for Pemex or for any other company that manages pipelines as a transportation route. Considering, FIG. 2 and for a better reference of the integration of the technologies described above to detect leaks and unauthorized intakes in pipelines, the operation of our monitoring and detection system is described in detail below, which is the reason of this document.

Figure 2:
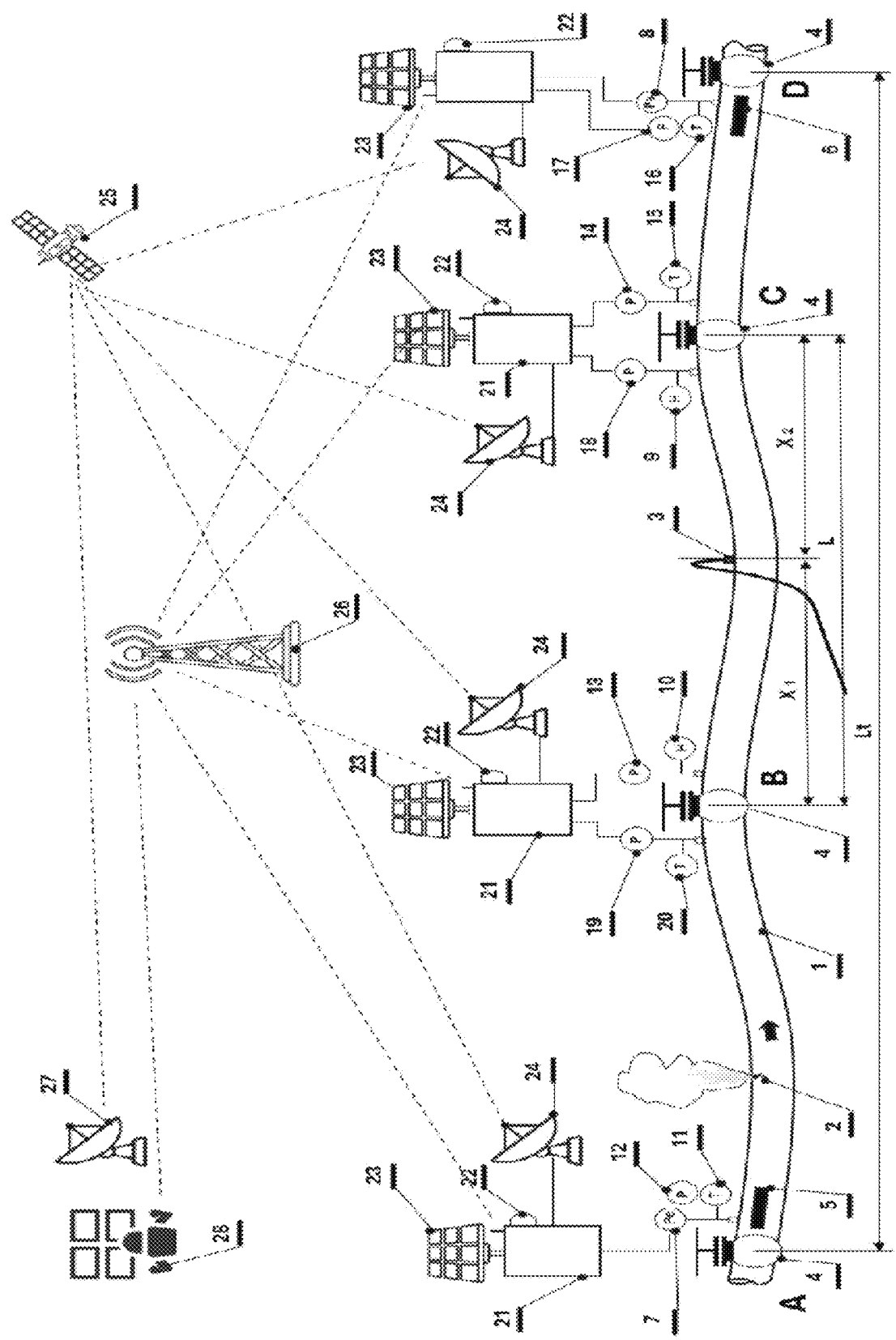
FIG. 2 illustrates a diagram of the system components and their interaction for the detection of leaks or unauthorized connections in a pipeline.

With reference to FIG. 2 and to give certainty that the system in question has better advantages than the equipment found in the literature and described in the background section and to illustrate that the system of the present disclosure more reliably provides the location of leaks and intrusion into the pipeline that is inspected due to the configuration of three methodologies and data processing through cross analysis and other characteristics already mentioned, its operation is provided below in detail.

Considering that the various sensors used are mechanically installed on the existing connections in a section AD of the pipe to be inspected 1. Due to the design of the pipe, these connections are generally superficial, they have a typical arrangement formed by a "sockolet" or "nipolet" welded on the pipe, in either case a pipe section and a gate valve with dimensions from 1½" to 2" are located before and after of a sectioning valve 4. This condition may vary, and for the installation of the equipment in case the inspection of a certain section is required, only the existence of mechanical connections on the pipe is needed for the installation of the sensors.

The location of the hydrophones 9, 10 according to FIG. 2, can record acoustic phenomena upstream and downstream, so it can be installed at intermediate points along the pipe; for example, at points B and C or at points However, it is important to consider the interference caused by other connections such as sectioning valves or any other device. The information obtained by the temperature sensor at each point 12, 15, 16, 20 is used to characterize the fluid and determine the propagation speed of the acoustic wave. The signal produced by the hydrophone is susceptible to noise from external sources as well as its inherent static, which is why it features a low-noise amplifier with unity gain. The information obtained by these sensors is sent to a data acquisition and processing controller (DAPC) with the necessary characteristics for the acquisition, storage, processing, and conditioning of signals emitted by the sensors of the acoustic system, pressure wave analysis system, and flow energy and mass balance system 21. This unit can be controlled and supervised remotely by a WEB server or a Supervisory Control and Data Acquisition (SCADA) network. Additionally, the unit receives data from the flow measurement system under a communication protocol through analog signals from pressure, temperature and hydrophone sensors, encodes the signals and sends them to a satellite modem to be transmitted through a parabolic antenna 24 to the monitoring center of ducts 28 through satellite communication bands 25 and as a redundant option sends the encrypted signals to a cellular modem for transmission through the communications network via cellular 26. To operate autonomously in the electrical aspect, an electrical power system was designed by solar panels 23, a voltage regulator and a battery block, with this system all the instruments that require electrical energy for its operation and enables the system to work in a period of 24/7, without interruptions. For your protection the DAPC, the satellite modem along with the cellular modem and the elements that composed the electrical power supply such as the current inverter, charge controller and batteries, as well as the surveillance system integrated by a camera with motion detector are installed in a cabinet 21, type NEMA 4 (National Electrical Manufacturers Association), explosion resistant. The system has different mechanical arrangements to install the cabinet on the walls near the installation points of the sensors or on a steel post fixed to the floor. Also, it has special mechanical arrangements against destruction by third parties and attempted theft of equipment.

Figure 3:
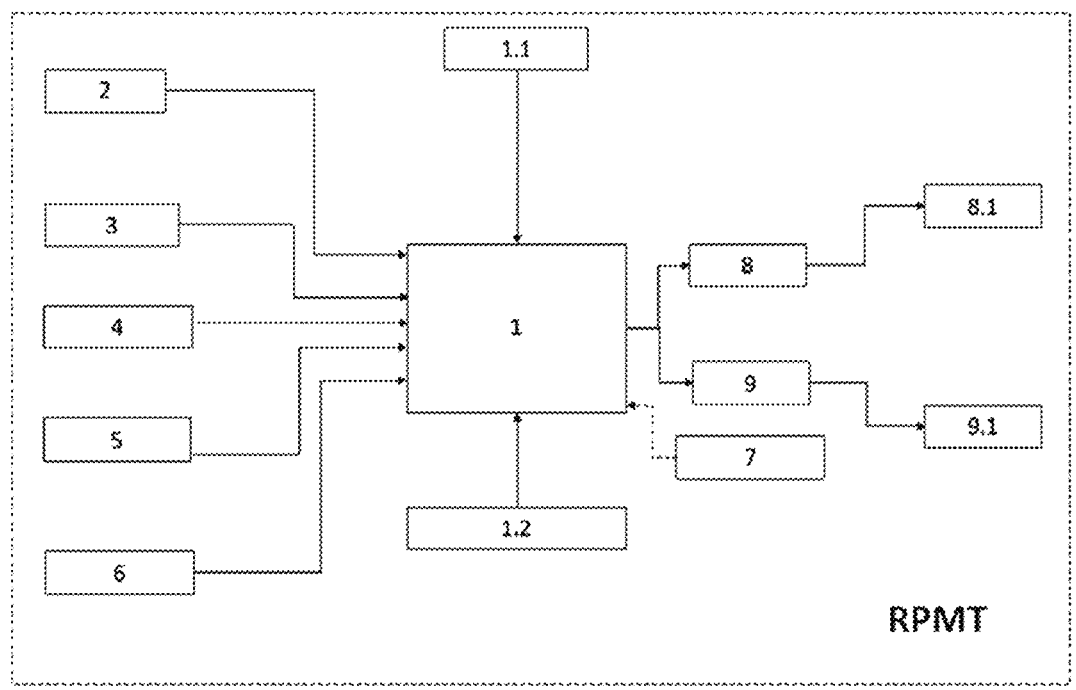
FIG. 3 shows a diagram of the sensors, instruments and equipment that make up the Remote Pipeline Monitoring Terminal (RPMT)|

For the operation of the negative pressure wave detection system, it is required to install pressure sensors 11, 19, 13, 18, 14, 17 and temperature sensors 12, 20, 15, 16, between the points to be monitored and on the external infrastructure of pipe 1. In the case of the pipe presented in FIG. 2, it is necessary to consider the interference that could be caused by the sectioning valve 4, that is why it is advisable to place the pressure sensors in the section intermediate between the valves, as shown in sections AB, BC and CD. The initial flow conditions and their variation over time at each point, A, B, C and D are analyzed using temperature sensors 12, 20, 15, 16 and pressure to determine the speed of sound propagation in the fluid, as well as the physicochemical properties of the product being transported. When a leak occurs 2 or an unauthorized outlet 3 is installed in a pipeline, pressure drops suddenly at the leak position and generates a negative pressure wave, which propagates with a certain speed upstream and downstream of the pipeline 1. To detect this effect, the monitoring system uses two pressure sensors that are installed at the ends of the sections of the AB, BC or CD pipeline. Both sensors 11,19 (in the case of section AB), 13,18 (in the case of section BC), 14,17 (in the case of section CD), identify the negative pressure wave, the leak in the pipe and its location is estimated by analyzing the pressure variations and calculating the time difference between the arrival times of the negative pressure wave at each end. For example, for the section of pipe AB the presence of a leak 2, is determined by estimating the time, in which the pressure wave arrives towards the closest pressure sensors, in this case they are sensors 11 and 19 located at points A and B. Calculated time is related to the distance $X_1$ and/or $X_2$ traveled by the pressure wave and to the speed of movement of the wave within the fluid as a function of temperature as well as the length of the pipe section L, the distance $X_1$ that the wave travels towards the closest pressure sensors in a recorded time at a given speed, is considered as the point where a leak or unauthorized product intake is located. This method can be applied in any section of the pipeline and provides the advantage of monitoring long lengths of the pipeline, if it is divided into sections or stations, as shown in FIG. 2. Each section will send information to a RPMT 21, forming a monitoring network by sections, where each section is monitored independently. The RPMT, (Remote Pipeline Monitoring Terminal) according to FIG. 3, is made up of a Data Acquisition and Processing Controller (DAPC) 1, a solar panel 1.1, a Filtering Pre-processing and Signal Adequacy unit 1.2, a pressure sensor 2, a hydrophone 3, a temperature sensor 4, a vibration sensor 5, a flow meter 6, a perimeter surveillance camera 7, a satellite modem 8, connected to a satellite antenna 8, a cellular modem 9, connected to a cellular antenna 9.1.

Additionally, and as already mentioned, the pipeline monitoring system, specifically in the negative pressure wave detection system, pressure and temperature sensors are used, which are mechanically installed outside the pipeline; the actual measurement of the flow is estimated by heat transfer theory, taking as a reference the measurement of the outside temperature of the duct previously thermally isolated from the environment. The condition of the pressure sensors used in this system, where the sensor electronics are galvanically separated from the measurement line, makes it possible to reduce the susceptibility of measurements to interference and to increase safety in intrinsically safe and fireproof applications. The operating principle of the pressure sensor is as follows: the electrical signal from the sensor that is proportional to the existing pressure in the pipe is sent to an analog input and converted into a digital signal. The digital signal is transmitted through the optoelectronic galvanic barrier to the conditioning module.

The microcontroller on the main board reads the measured values and by internal algorithms, calculates the exact value of pressure and temperature at any given time. The calculated value of the process variable is displayed on an LCD screen integrated into the sensor itself, which can be configured as required. The digital value of the measured pressure signal is converted into an analog signal and sent to a modem which allows communication through a converter that can be connected to a PC (Personal Computer).

For the operation of the leak detection system by means of the mass and fluid energy balance method, the installation of flow meters is required. In the case of long pipes, it is necessary to install the meters at the points where is considered as flow outlet; according to FIG. 2, it is point A, and at the point where it is considered as flow arrival, point D, or to carry out comprehensive monitoring of a specific section of the pipeline; the flow meters must be installed at the extreme points. The monitoring system according to an embodiment in FIG. 2, uses ultrasonic transducers 5, 6, placed outside the pipe to measure various variables, including the viscosity and speed of the fluid, also the speed of sound in the medium; in addition to the volumetric or mass flow rate if the diameter of the pipe is known, uses the inlet pressure and outlet pressure variables, obtained by the pressure sensors 7, 8 coupled to the mechanical connections of the duct, as explained in the acoustic method; it also uses temperature sensors that are installed on the outside of the duct. Ultrasonic flow meters can work under two modes of operation, with flow in liquids and with flows with high content of gas and solids. All the transducers installed in the pipeline are connected to the processing unit through two channels for communication; the position of the transducers will depend on the diameter, thickness, and internal roughness of the pipe. The processing unit has ports for connection with pressure sensors 7, 8 and temperature 12, 16, which are connected in passive mode receiving power from the system itself, the sensors used in this module are independent of those used in acoustic detection and negative pressure wave detection systems; the enabling of the sensors is done by special functions of the flow meter's data acquisition system.

The information obtained by the flow measurement system is sent to the DAPC controller, the data is transferred through a Modbus communication protocol. This type of communication requires a certain number of devices, an address whereby the measured variables are identified and a code function to operate as the master, the sending data is considered a function of the slave. The acquired data is classified to give them an address and identification to be used in the programming codes that contain the development of the fluid mass and energy balance methodology used to detect the leak. In these terms, the system uses numerical keys for the flow meters, the data is acquired with a communication protocol at a certain transmission speed. The memory addresses to be read are listed and store the subsequent data considering their respective units as is indicated in Table 1.

TABLE 1

| Physical parameter | Units |
| --- | --- |
| Average temperature of fluid | ° C. |
| Average pressure of flow | PSI |
| Speed of sound | m/s |
| Volumetric Flow | m$^3$/h |
| Mass flow | g/s |
| Density | Kg/m$^3$ |

For the operation of the Perimeter Surveillance System, a distinctive feature of the present disclosure, the installation of a motion sensor and a video camera is required, which have the function of detecting and taking images in real time of any person who enters to the installation place, it is recommended that this place be those strategic points where it is required to monitor the conditions of the facilities. This system does not intervene in the detection of leaks; however, it can display any attempt to manipulate the company's facilities without authorization. According to FIG. 2, the surveillance system 22 can be installed inside a cabinet 21. For the correct operation of this surveillance system, an IP address is required, which is assigned by a satellite modem.

The surveillance system is oriented towards the area that is desired and it is oriented towards the area to be inspected. It has an adequate viewing angle to widely monitor the area; it has face recognition, people counting or movement tracking software, it allows audio and video recording in If any movement is detected in a certain area, as well as a change of focus or crossing of lines, all the information recorded by the surveillance system is sent to the pipeline monitoring center 28, where, in the user's opinion, the information can be analyzed and generate alarms for intrusion into the facilities. This system has the option of programming operation by days and hours, as well as making decisions about the local storage of information by installing a memory or transferring the information via an FTP (File Transfer Protocol) server or via email. It also provides the option of storing information from the moment of detecting movements in the area and generating an alarm, the saved images are made including the time stamp. It should be noted that in the monitoring center an FTP server must be registered and the information generated in the motion sensors must be managed. Tests carried out have shown that it is also possible to link the surveillance system with the DAPC controller so that at the time of an intrusion into the area, not only is the image sent to the control center, but a record is also generated in the DAPC controller and therefore a flag is generated through which a synchronization between both devices is carried out. The surveillance system can also send emails to notify or mark an alert to the user of the existence of an event that is occurring, this email includes the option of sending a photo of the event. The information obtained by this system is of the utmost importance and its management must be confidential, for this purpose the information is encrypted and its disclosure is governed by security levels in accordance with the regulations of the user agencies.

All the information obtained by the systems described above is taken through electrical wiring to the data acquisition and processing controller integrated to the RPMT, located in the field, at the measurement sites where the information is processed at a first level to be sent by means of signals, satellite and alternatively using the cellular communication network to a data acquisition server located in a monitoring center. According to FIG. 2, the Remote Pipeline Monitoring Terminal (RPMT) is installed at points A, B, C, D, where each location is identified with a unique and unrepeatable license plate, to maintain control over the information from the sensors installed to monitor the different sections of the pipeline, thus facilitating the location of the findings in a precise way. The central data processing unit 28 is located in a remote area from the pipeline facilities, it can also be identified as a pipeline monitoring center; in this place, the data processing algorithms are installed to detect and locate leaks of product in real time 2 or installation of unauthorized outlets 3, an action also known as milking the pipeline, there is also the hardware that will serve as a communication interface with the user. In this place, a communications server receives the information sent by the DAPC controller through satellite channels 24, 25 and/or cellular 26, through a polling process which is executed every minute, from the corresponding data collection point of each of the detection systems, acoustic, negative pressure wave and fluid mass and energy balance method. The data received is stored in a database, whose access is through communication links through encrypted transactions on a special communication protocol. In principle, to detect a possible leak alarm, the data is discriminated by the DAPC controller and subsequently classified as polling data or as data with out-of-range values; polling data is loaded directly into the database and if an out-of-range value occurs, a concurrent execution thread is created to process the alarm and if it results in event detection, the data is tagged to be processed by leak detection algorithms. It is worth mentioning that the initial data of the pipeline to be analyzed are uploaded to the database, to correlate the geographical position of the pipeline with the possible leak detections, a special template is used to enter the characteristic data of the flow and the geographic information of the pipeline. The information sent from each section of the pipeline, points A, B, C, D, are encoded in data frames and contain the identification of the place from where the data and the values of the variables measured through the sensors are sent.

One more feature of this disclosure is its capability of more accurately determining the presence of a leak 2. The duct monitoring system uses two detection modules: one identified as Leak-Balance Detector Calculation (LBDC) and other the Acoustic Leak Detector module (ALD). The ALD module has two detection methods, one called Direct Time Stamp Correlation (TSC) and the Signal Cross-Correlation (SCC) method. The LBDC detection module together with the ALD module integrate the detection system that can be seen by an operator through a console, where the trend and alarm graphs sent by the RPMTs are shown in principle. In DAPC controllers are only implemented algorithms that detect the signal beyond a permissible range (out of range, peaks in the signal), the limits of analysis vary, due to fluctuations of the flow conditions over time. The algorithms that detect leaks in the ALD and LBDC, receive by input the parameters that come from each RPMT and emit event alarms. The polling is periodic and only send the measurements of the instruments. If any measurement is out of range, then they also send the time stamp of the signal peak that occurred in the minute before the polling. These time stamps are read in auxiliary records that indicate that some peak in the signal has occurred (out of range). The monitoring center server verifies these auxiliary logs and if there is any data out of range, it sends it to the ALD module. This in turn is responsible for requesting directly from the DAPC controller the log record of the corresponding minute (but only until it receives some data out of range). SCC notifies the GIS module (displayed on the map) of the occurrence of the event. These events appear on the map above the pipeline. The SCC method operates by digital signal processing and the TSC with mathematical formula programming algorithms that describe the effects of leakage on the flow, only considering data found out of range. The leak point is estimated by a weighted average. Each module or method is assigned a weight that influences the average. According to FIG. 2, for the operation of the acoustic system for the detection of leaks 2 and/or unauthorized (clandestine) socket 3 in a section of AD pipe, the installation of hydrophones 9, 10 on the mechanical connections is required. An essential feature in this methodology is that the hydrophone must be in contact with the fluid, which functions as a means of propagation of acoustic waves; to achieve this condition a special device was developed to introduce the sensor inside the pipe with the necessary mechanical conditions to attach it to the existing connections, this device can withstand the environmental conditions of the workplace, since it is made of stainless steel, FIG. 4 shows an example of installing sensors on the existing mechanical connections in pipe (1 valve for connection to SCADA systems, 2 mechanical attachment containing an acoustic sensor, 3 pressure sensor, 4 purge valve, 5 conduit pipe).

FIG. 5 shows the parts that make up the mechanical attachment to install the hydrophone (1 mechanical connector for tie with valve, 3 support for electronic tablet, 4 amplifier, 5 protection jacket, 6 electrical connectors, 7 hydrophone support, 8 hydrophone, 9 protector, 10 bushing connector). The negative pressure wave is a singular pulse as can be analyzed in FIG. 6 (Source: *An Improved Negative Pressure Wave Method for Natural Gas Pipeline Leak Location Using FBG Based Strain Sensor and Wavelet Transform*), the duration time of the disturbance is approximately 20 milliseconds, so pressure sensors are required to have a higher response rate. FIG. 7 shows an example of the installation of the equipment that makes up the RPMT, described in more detail in FIG. 3. Cabinet 21, together with the sensors necessary for the operation of the acoustic system, the negative pressure wave analysis system and the mass balance and flow energy system, integrate the Remote Pipeline Monitoring Terminal, which is located at strategic points, as can be seen in FIG. 2, points A, B, C and D. FIG. 8 shows an outline of the structure of the data acquisition system, based on a storage unit and its interaction with the communication interface with the user and the data processing methodologies acquired by the DAPC units.

Data control of the Acoustic Leak Detector (ALD) system. The most effective method of leak control is to subdivide the pipeline into sections with lengths that are within the ranges of the sensors used; the installation of sensors in the supply network permanently will allow to continuously monitor the state of the pipeline to detect and locate leaks using the correlation technique. This is one of the most complete methods for detecting leaks. For its application, the acoustic and pressure wave propagation velocity (WPV) must be known. As can be seen in FIG. 2, when a blow or fracture occurs in the segment monitored by the hydrophones 9, 10, there is a propagation of acoustic and pressure waves that, depending on the speed of sound in the propagation medium, the direction of flow and the point at which it occurs; will be detected at different instants of time. This time difference constrained by the length of the monitored segment is used to determine the point where loss of contention has occurred. The location of the leak point is obtained by means of a direct correlation function, knowing the distance between the sensors (L), the speed of propagation of the sound of the leak in the fluid v and the time difference between the disturbances of the signal $\Delta t$.

FIG. 9 shows the flow chart of the detection algorithm. As can be seen, in the first stage, notifications are received from the communications module. To start processing them, it is first verified that they are out-of-range notification and a potential alarm is created with the necessary parameters for processing (pressure measurements, temperature, hydrophone, time stamp). After this, it is determined if there is any adjacent station that has presented an out-of-range notification that can be correlated with said potential alarm. The proportionality between $\Delta t$ (the difference between the timestamps of the station that issued the notification B and the closest adjacent station C in time) and L (the distance between stations) is established when $\Delta t < T$ (the time required for the acoustic signal to travel from station to station), which indicates that the event (hit, leak) does indeed occur between the stations in question. If the constraint $\Delta t < T$ is not met, the potential alarm is discarded, and the system waits for new notifications.

Data control of the Flow Detection by Balance Calculation (LBDC). The non-intrusive Comprehensive Pipeline Monitoring System includes a Balance Calculation Leak Detection (LBDC) server, where a mathematical model of mass and energy balance is implemented to detect leak events by means of hydraulic gradients, as shown illustrated in FIG. 10, where the distance at which leak 3 is located at the intersection of the modeled and measured pressure gradients at the upstream 1 and downstream 2 borders of the pipeline. When fitting the model, there should be no difference between the modeled and measured pressure gradients, it is assumed that the model is correctly balanced. This method is based on the expectation that a leaking disturbance will eventually settle down to a new steady-state position. The LBDC algorithm makes a connection with a database located on a monitoring center server, to read the measurements from the upstream and downstream instruments, respectively. Additionally, communication is maintained with the GIS server through the sending of a data chain, where the location of the events detected is notified through a directed connection link. The operation of the LBDC algorithm was implemented from the development of modules with specific functions. FIG. 11 shows the distribution diagram of the modules that make up the application.

Uncertainty of Event Detection. The reliability and precision in the detection of events that occur along the pipeline may be affected by internal factors in the detection systems and by external factors, present in the data acquisition, transmission and processing stages. The present development uses uncertainty factors in each of the detection methods, which are combined to more accurately locate the events that occur, these factors complement the limitations and disadvantages that each of the methods could have separately. In this way, reliability and certainty are strengthened by having several detections corresponding to a real event. FIG. 12 shows a scenario for detecting and locating an event recorded by the different detection modules, each one is represented by a circle with a radius corresponding to the magnitude of the associated uncertainty, also called the uncertainty coefficient. The location point is estimated by each method and the weighted arithmetic average of the associated uncertainty, which are used to more accurately determine the leak point or event on the pipeline. FIG. 13 shows an example scenario with 5 detection methods (Direct Correlation for pressure and hydrophone signals, Cross Correlation for pressure and hydrophone signals and mass balance calculation) with associated weighting parameters, related to uncertainty detection and location of each. By the direct correlation method, the pressure and hydrophone signals have 17.5% each (35% together), by the cross-correlation method, the pressure and hydrophone signals have 17.5% each (35%) in set and for the balance calculation method it has a weighting of 30%. The total contribution of each module must add up to 100%.

Suppose that all the selected events are grouped in such a way that we have a vector of counts:
counts=[CDP, CDH, CCP, CCH, CBM]
counts=[5,0,0,4,3]
that is, 5 detections with the direct correlation module for the pressure signal, 4 detections with the cross-correlation module for the hydrophone signal, and 3 detections with the mass balance calculation module. If the cumulative sum of detection distances of each event for each category is:
distances=[49.39, 0, 0, 38.16, 27.95]
then the average distance results from dividing each element of the distances vector by each element of the counts vector:
avg. dist.=[9.87, 0, 0, 9.54.9.31]
Considering that the vector of weighting parameters is:
weights=[0.175, 0.175, 0.175, 0.175, 0.3]
then, based on the counts vector, those weights for which there are no events (counts equal to zero) must be distributed among the elements whose event counts are different from zero. We observe, therefore, that inputs 2 and 3 of the vector weights must be distributed between inputs 1, 4 and 5. Therefore, the vector of modified weights is:
mod. weights=[0.29166, 0, 0, 0.29166, 0.41666]
Note that the sum of the elements of the weights mod vector is, in theory, 1. Finally, the estimated distance is obtained by means of the inner product of the vectors dist_avg and weights_mod. The fundamental aspect in the process of locating the point where an event occurs consists in determining the weighting parameters of the weight vector, based on the detection and location uncertainties of each detection module. In this way, some modules influence more than others in the weighted average for the final determination of the location.

To illustrate the application, an example related to the comprehensive non-intrusive system for monitoring pipelines in real time, an object of the present disclosure and described previously, is presented below, without limiting its technical scope:

EXAMPLE: The operation of the system was tested under field conditions with a 14" liquefied gas pipeline, the instruments and sensors were installed in the pipeline without altering its structure, taking advantage of the existing installations, were connected to the DAPC controllers of the Remote Pipeline Monitoring Terminals (RPMT 1 and RPMT 2), installed near the sectioning valves. The hydrophones were installed in the pipe using an arrangement similar to that described in FIG. 4, the hydrophone was installed using the hydrophone bracket, similar to that shown in FIG. 5. FIG. 14 shows the mechanical arrangement of the device in field, in which the hydrophone support 1, pressure sensor 2 and the valve installed in the pipeline are observed. The signals detected by the hydrophones in the section between the stations monitored by RPMT 1 and RPMT 2 were recorded in the monitoring center server (FIG. 15) and through the algorithm:

$$X = \frac{L - V\Delta t}{2}$$

where X represents the distance from the leak or hit point to the reference sensor, L the distance between the two sensors, V is the propagation speed of the signal in the medium, $\Delta t$ is the time delay obtained from the position of the peaks of the event. The test showed the correct operation of the hydrophones at distances of up to 18 km when an intrusion into the pipeline occurred, which was recorded and its location calculated, as shown in FIG. 15. These results demonstrated the possibility of using hydrophone-type sensors in industrial pipeline monitoring systems.

Similarly, the operation of the vibration sensor (fiber optic sensor for detecting vibrations and acoustic waves, Patent No. 351899), which is also part of this pipeline monitoring system, was tested under field conditions and was installed in the outer wall of the duct as shown in FIG. 16, this sensor detected the effects (blows) of the duct wall at a distance of up to 6 km from the RPMT, activating an alarm in the process controller as shown in FIG. 18.

In the development of the application, various events were obtained where disturbances or noise detected by the hydrophones were recorded, one of which is shown in FIG. 17, where the response of hydrophone 1 (from the Remote Pipeline Monitoring Terminal 1, RPMT 1) and hydrophone 2 (from the Remote Pipeline Monitoring Terminal 2, RPMT 2). As can be seen in the figure, the sensors show an inherent noise, in which there is no direct correlation between the signals recorded by station one and two, but in the period of 21 hours it is observed that both sensors detected an event that exceeds the 2 dB peak and $\Delta t$ is less than the maximum time of the window between both terminals, for which it was reported as an event.

Additionally, based on the processing of real data from the SCADA system, the operation of the fluid energy and mass balance calculation system was tested by processing data from the pressure, temperature and flow sensors, determining location by calculating hydraulic gradient line crossings using upstream boundary conditions and in the reverse direction using downstream boundary conditions. The location of containment leaks in the pipeline, using the non-intrusive monitoring system for pipelines that transport hydrocarbons, is shown in FIG. 18, which shows 5 hydrocarbon outflow events between kilometers 656 and 658.

Having extensively described the characteristics and operation of the Non-Intrusive Comprehensive System for Monitoring Pipelines in Real Time, some embodiments of the technical specifications are presented below:

Operates in pipelines that transport hydrocarbons in gaseous and liquid phase.

The systems and sensors used can withstand the operating pressure and temperature of the pipeline.

It has a sensitivity to detect product leaks of 1% of the duct flow rate or product losses through holes with an area equivalent to a 6 mm diameter hole.

The maximum response time to detect a leak is 3 min.

The monitoring system installed in the field can work continuously and autonomously 24/7.

Its technological base is based on the use of pressure, acoustic, temperature and flow measurement sensors, which are installed on the pipeline structure in a non-intrusive way (without modifications or damage to its mechanical structure).

The detection methodology is based on fluid energy and mass balance analysis, acoustic method and negative pressure wave analysis.

It is made up by two blocks of equipment, the first one installed in the field and the second one installed in a monitoring center, both are connected remotely through satellite communication and alternatively by cell phone.

The pipeline monitoring system requires the installation of instruments and sensors at a minimum of two points along the length of the pipeline, separated by a certain distance, in order to detect the occurrence of a leak or the installation of unauthorized branches; Under this principle, the pipeline of great lengths can be instrumented by sections, generating a monitoring network with independent inspection by section.

It has the development of programming algorithms for data processing to issue information on leak detection in real time and communication with a user.

Information on the behavior of the instrumented sections of the pipeline can be displayed graphically on a screen in real time, where the location of an event can also be seen if it is detected.

It has motion detection systems that can be installed in strategic places for site surveillance (generally points where there is a sectioning valve), it has night vision capacity, when it detects a movement it sends an alarm and images to the pipeline monitoring center where they can be viewed and analyzed to take the necessary actions.

The data acquisition and processing system is installed in a monitoring center that has image projection and visualization equipment, where the geographical position of the pipeline is previously uploaded, using GPS coordinates on virtual plans, which are used to locate the place where a product leak event takes place.

The system as a whole can be connected with SCADA systems.

The invention claimed is:

1. A non-intrusive Integral System for monitoring pipelines in real time to detect and locate leaks in the transport of hydrocarbons comprising: three integrated modules: (a) an Acoustic System; (b) a Negative Pressure Wave Detection System; and (c) a System that analyzes the Mass and Energy Balance of product in a pipeline, wherein the system uses three processes: one a direct correlation using time stamps, a second a cross-correlation that uses pressure and hydrophone signals, and a third process identified as calculation mass balance and fluid energy.

2. The Non-Intrusive Integral System, in accordance with claim 1, wherein the system includes at least two Remote Pipeline Monitoring Terminal (RPMT), each of which is located at different points along the pipeline, where pressure sensors, hydrophones, temperature sensors and flow meters have been integrated; whose outputs are connected to the inputs of a data acquisition and processing controller used in a first stage for preliminary filtering of signals and generation of alarms for leaks and intrusions into the pipeline.

3. The non-intrusive Integral System, in accordance with claim 2, further comprising an electronic circuit for the identification of dynamic thresholds of instantaneous pressure in a section of the pipeline inspected, which reduces the generation of false alarms.

4. The non-intrusive Integral System, in accordance with claim 2, further comprising a satellite modem in redundancy with a cellular modem, which connect to a server in a remote monitoring center.

5. The non-intrusive Integral System, in accordance with claim 4, further comprising, a motion sensor, integrated with a video camera or an infrared camera, which send captured images and video to the monitoring center, at the time of an intrusion into the pipeline in the area protected by the RPMT.

6. The non-intrusive Integral System, in accordance with claim 2, wherein the system integrates a vibration sensor based on fiber optics, installed on the outer wall of a pipe of the pipeline, which is connected to a process controller (DAPC) of the RPMT, to detect damages or intrusions on the external walls of the pipeline in areas close to the location of the RPMT.

7. The non-intrusive Integral System, in accordance with claim 1, wherein the system locates the leak point with an accuracy of 1% of the distance between stations.

8. The non-intrusive Integral System, in accordance with claim 1, wherein the system detects a leak with an average time of 1 min, providing a leak detection efficiency and flow diversions of 95%.

9. The non-intrusive Integral System, in accordance with claim 1, further comprising a Hydrophone Protector, configured to maintain contact between the fluid circulating in the pipe of the pipeline and a hydrophone while allowing the operation of the acoustic monitoring system without disturbing the behavior of the fluid, the hydrophone protector having mechanical adaptations to be coupled to valves installed in the pipeline where measuring instruments and sensors are connected.

10. The non-intrusive Integral System, in accordance with claim 1, wherein the system integrates a server located in a monitoring center with the capacity to acquire, store and process the measurements received from pressure sensors, a hydrophone, temperature sensors and flow sensors.

11. The non-intrusive Integral System, in accordance with claim 1, wherein the system sends notifications automatically and in real time to a user, about the status of the pipeline and the occurrence of events for decision-making and appropriate actions.

12. The non-intrusive Integral System, in accordance with claim 1, wherein the Acoustic System includes hydrophone protector that contains a hydrophone sensor.

13. The non-intrusive Integral System, in accordance with claim 1, wherein a module of the Negative Pressure Wave Detection System is includes the following elements: pressure sensors and temperature sensors.

14. The non-intrusive Integral System, in accordance with claim 1, wherein the System that analyzes the Mass and Energy Balance of the product includes the following elements: Ultrasonic transducers for non-intrusive flow measurement, pressure sensors and temperature sensors.

15. The non-intrusive Integral System, in accordance with claim 1, wherein the system is configured for: a) acquisition of flow behavior data, based on the measurement of parameters of pressure, temperature, negative pressure waves, noise and flow measurement, and generation of images; b) processing and transmission of data in real time using satellite media or communication signals via cellular; c) generation of events/leaks, where the uncertainty of the three modules is correlated to detect the leak point with an accuracy of 1% of the distance between stations; and d) data visualization, where digital maps previously loaded into a database are used to analyze through a communication interface installed in a remote location from the monitoring point.

16. The non-intrusive Integral System, in accordance with claim 1, wherein a a server is configured to: a) categorize, group and count selected events; b) totalize distances reported per event for each detection module; c) obtain an average distance of each category; d) based on weighting parameters, determine a global location from averages obtained.

17. The non-intrusive Integral System, in accordance with claim 1, wherein the system is configured to determine, locate and display leaks and connections on georeferenced maps on server screens, as well as analyze a status of the sensors and other components of the system to allow issuing notifications to a system operator in a monitoring center or to a user through a WEB page of an application.

18. A non-intrusive Integral System for monitoring pipelines in real time to detect and locate leaks in the transport of hydrocarbons comprising: three integrated modules: (a) an Acoustic System; (b) a Negative Pressure Wave Detection System; and (c) a System that analyzes the Mass and Energy Balance of product in a pipeline, wherein the system locates the leak point with an accuracy of 1% of the distance between two monitoring stations.

19. A non-intrusive Integral System for monitoring pipelines in real time to detect and locate leaks in the transport of hydrocarbons comprising: three integrated modules: (a) an Acoustic System; (b) a Negative Pressure Wave Detection System; and (c) a System that analyzes the Mass and Energy Balance of product in a pipeline, wherein the system detects a leak with an average time of 1 min, providing a leak detection efficiency and flow diversions of 95%.

* * * * *